US010286977B1

(12) United States Patent
Haenel

(10) Patent No.: US 10,286,977 B1
(45) Date of Patent: May 14, 2019

(54) HOVERBOARD WALKER ATTACHMENT APPARATUS

(71) Applicant: Robert Haenel, Compton, CA (US)

(72) Inventor: Robert Haenel, Compton, CA (US)

( * ) Notice: Subject to any disclaimer, the term of this patent is extended or adjusted under 35 U.S.C. 154(b) by 0 days.

(21) Appl. No.: 15/883,074

(22) Filed: Jan. 29, 2018

Related U.S. Application Data

(63) Continuation-in-part of application No. 15/690,132, filed on Aug. 29, 2017.

(51) Int. Cl.
A61H 3/04 (2006.01)
B62K 27/14 (2006.01)
B62K 11/00 (2006.01)

(52) U.S. Cl.
CPC .............. B62K 27/14 (2013.01); A61H 3/04 (2013.01); B62K 11/007 (2016.11); A61H 2003/043 (2013.01)

(58) Field of Classification Search
CPC .... A61H 3/04; A61H 2003/043; A61G 5/047; B62K 11/007; B62B 5/005; B62B 2207/00; B62B 2207/02
See application file for complete search history.

(56) References Cited

U.S. PATENT DOCUMENTS

| 5,016,720 | A | * | 5/1991 | Coker | .................... A61G 5/047 180/13 |
| 5,168,947 | A | | 12/1992 | Rodenborn | |
| 5,390,753 | A | | 2/1995 | Parker | |
| 5,651,422 | A | * | 7/1997 | Casali | .................... A61G 5/047 180/13 |
| 5,826,670 | A | * | 10/1998 | Nan | ........................ A61G 5/047 180/15 |
| 6,360,836 | B1 | * | 3/2002 | Milano, Jr. | ............. B62B 5/005 180/65.6 |
| 6,896,079 | B1 | * | 5/2005 | Axelsson | ................ A61G 5/047 180/11 |
| 7,000,933 | B2 | * | 2/2006 | Arling | ................... B62D 51/008 180/218 |
| 7,445,217 | B1 | * | 11/2008 | Price | ......................... A61H 3/04 135/67 |
| 7,635,037 | B2 | * | 12/2009 | Treadwell | ............... B62B 5/005 180/19.3 |
| 7,694,991 | B2 | * | 4/2010 | Mills | ..................... A61G 5/1051 180/11 |
| 7,699,128 | B1 | * | 4/2010 | Strauss | .................. B62B 5/0026 180/23 |

(Continued)

Primary Examiner — Katy M Ebner

(57) ABSTRACT

A hoverboard walker attachment apparatus to motorize a standard walker using a hoverboard. The apparatus has a principal support having a vertical stem, a pair of arms, and a hoverboard clamp attachment on a base of the principal support. The hoverboard clamp attachment is removably disposed on a hoverboard clamp disposed on a middle of a hoverboard such that it is completely fixed. A pair of walker clamps is disposed on a distal end of each of the pair of arms. Each of the pair of walker clamps is removably disposed on a leg of a walker. A user sits on a seat of the walker and places his or her feet onto a pair of platforms of the hoverboard. A kill switch is in operational communication with the hoverboard and may be disposed on the walker, wherein the kill switch is configured to cut power to the hoverboard.

2 Claims, 7 Drawing Sheets

(56) References Cited

U.S. PATENT DOCUMENTS

| | | | | |
|---|---|---|---|---|
| 7,976,049 B2* | 7/2011 | Chiu | A61G 5/047 | 180/13 |
| 8,532,841 B2* | 9/2013 | Fu | A61H 3/04 | 135/67 |
| 8,684,113 B1* | 4/2014 | Laconis | A61G 5/047 | 180/11 |
| 8,752,658 B2* | 6/2014 | Kurek | A61H 3/04 | 180/19.1 |
| 9,051,026 B2* | 6/2015 | Whitener | B62K 3/002 | |
| D736,121 S | 8/2015 | Wang et al. | | |
| 9,272,589 B2* | 3/2016 | Yamano | B60D 1/00 | |
| 9,326,901 B2* | 5/2016 | Conte | A61G 5/047 | |
| 9,403,573 B1* | 8/2016 | Mazzei | B62D 51/02 | |
| 9,463,122 B2* | 10/2016 | Pirone | A61G 5/1051 | |
| 9,523,983 B2* | 12/2016 | Chamberlain | G05D 1/0242 | |
| 9,650,061 B2* | 5/2017 | Katayama | B62B 5/0069 | |
| 9,688,340 B1* | 6/2017 | Kroymann | B62K 13/04 | |
| 9,701,329 B2* | 7/2017 | Johnson | B62B 3/008 | |
| 9,744,095 B1* | 8/2017 | Mazzei | A61H 3/04 | |
| 9,745,013 B2* | 8/2017 | Wood | B62K 11/007 | |
| 9,757,290 B1* | 9/2017 | Scognamiglio | A61G 5/10 | |
| 9,796,401 B1* | 10/2017 | Ammirati | B62B 5/005 | |
| 9,839,570 B2* | 12/2017 | O'Sullivan | A61H 3/04 | |
| 9,872,805 B2* | 1/2018 | Bach Castillo | B62K 5/025 | |
| 9,957,006 B2* | 5/2018 | Tinaphong | B62K 11/007 | |
| 9,968,507 B2* | 5/2018 | Rabin | A61H 3/04 | |
| 10,040,503 B2* | 8/2018 | Chen | B62K 11/007 | |
| 2008/0115982 A1* | 5/2008 | Lin | A61G 5/047 | 180/13 |
| 2010/0237645 A1* | 9/2010 | Trainer | G09F 15/0087 | 296/21 |
| 2011/0095508 A1* | 4/2011 | Chiu | A61G 5/047 | 280/304.1 |
| 2011/0304121 A1* | 12/2011 | Chiu | A61G 5/047 | 280/304.1 |
| 2013/0038036 A1* | 2/2013 | Lester | A61G 5/10 | 280/304.1 |
| 2015/0351979 A1* | 12/2015 | Conte | A61G 5/047 | 180/13 |
| 2017/0127842 A1* | 5/2017 | Sayed | A61G 5/10 | |
| 2017/0203811 A1* | 7/2017 | Germanovsky | B62K 27/003 | |
| 2017/0205820 A1* | 7/2017 | Liu | G05D 1/0016 | |
| 2017/0225736 A1* | 8/2017 | Chen | B62K 11/007 | |
| 2017/0326019 A1* | 11/2017 | Bramsiepe | A61H 3/04 | |
| 2017/0360632 A1* | 12/2017 | Slorance | A45C 5/14 | |
| 2018/0029662 A1* | 2/2018 | Acciardi | B62K 11/14 | |
| 2018/0141609 A1* | 5/2018 | Newhouse | B62K 17/00 | |
| 2018/0148080 A1* | 5/2018 | Huizinga | B62B 1/00 | |

\* cited by examiner

US 10,286,977 B1

HOVERBOARD WALKER ATTACHMENT APPARATUS

CROSS-REFERENCE TO RELATED APPLICATIONS

Continuation-in-Part of U.S. application Ser. No. 15/690,132 Filed Aug. 29, 2017

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of motorized walkers are known in the prior art. However, existing motorized walkers are expensive and are integral units that must replace a traditional walker. What is needed, and what the present hoverboard walker attachment apparatus provides, is a means of motorizing a traditional walker using another piece of easily acquired technology: a hoverboard. What is needed is a principal support having a main stem, a joint, a pair of arms, a hoverboard clamp, and a pair of walker clamps to join the hoverboard to the walker.

FIELD OF THE INVENTION

The present invention relates to motorized walkers, and more particularly, to a hoverboard walker attachment apparatus.

SUMMARY OF THE INVENTION

The general purpose of the present hoverboard walker attachment apparatus, described subsequently in greater detail, is to provide a hoverboard walker attachment apparatus that has many novel features that result in a hoverboard walker attachment apparatus that is not anticipated, rendered obvious, suggested, or even implied by prior art, either alone or in combination thereof.

To accomplish this, the present hoverboard walker attachment apparatus includes a principal support having a stem and a pair of arms disposed on a joint thereof. The stem and each of the pair of arms optionally have an adjustment mechanism, wherein the adjustment mechanism is configured to change a length of each of the stem and the pair of arms. The adjustment mechanism can be, but is not limited to, a plurality of apertures and a pin. The hoverboard clamp is configured to be rotatably and removably disposed on a hoverboard clamp that is disposed on a middle of a hoverboard such that it is completely fixed and secure. A pair of walker clamps is rotatably disposed on a distal end of each of the pair of arms. In an ideal embodiment of the invention, each of the pair of walker clamps is a C-shape that is selectively engageable with a leg of a walker. In an alternative embodiment of the invention, each of the pair of walker clamps is removably disposed on the leg of the walker such that it is completely fixed and secure. A user sits on a seat of the walker and places his or her feet onto a pair of platforms of the hoverboard. A throttle mechanism in operational communication with the hoverboard may optionally be disposed on the walker, wherein the throttle mechanism is configured to control the throttle of the hoverboard. A kill switch in operational communication with the hoverboard may optionally be disposed on the walker, wherein the kill switch is configured to cut power to the hoverboard. A braking mechanism that is in operational communication with the hoverboard may also be disposed on the walker.

Thus have been broadly outlined the more important features of the present hoverboard walker attachment apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
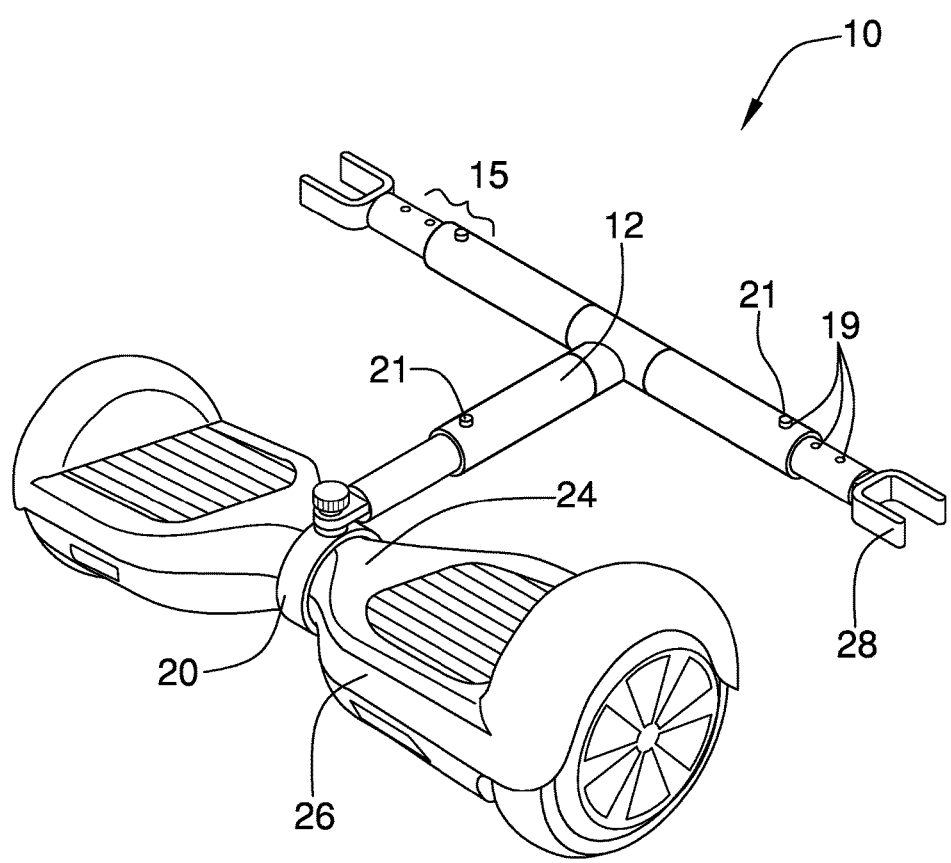
FIG. 1 is an isometric view of a hoverboard walker attachment apparatus attached to a hoverboard.
Figure 2:
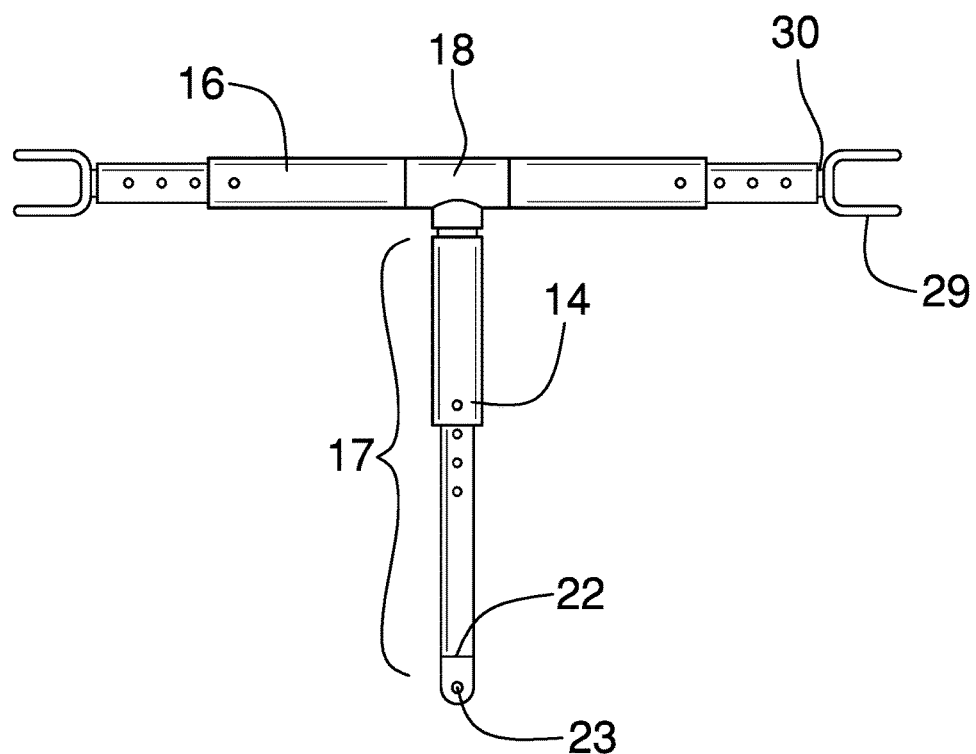
FIG. 2 is a top plan view of the hoverboard walker attachment apparatus.
Figure 3:
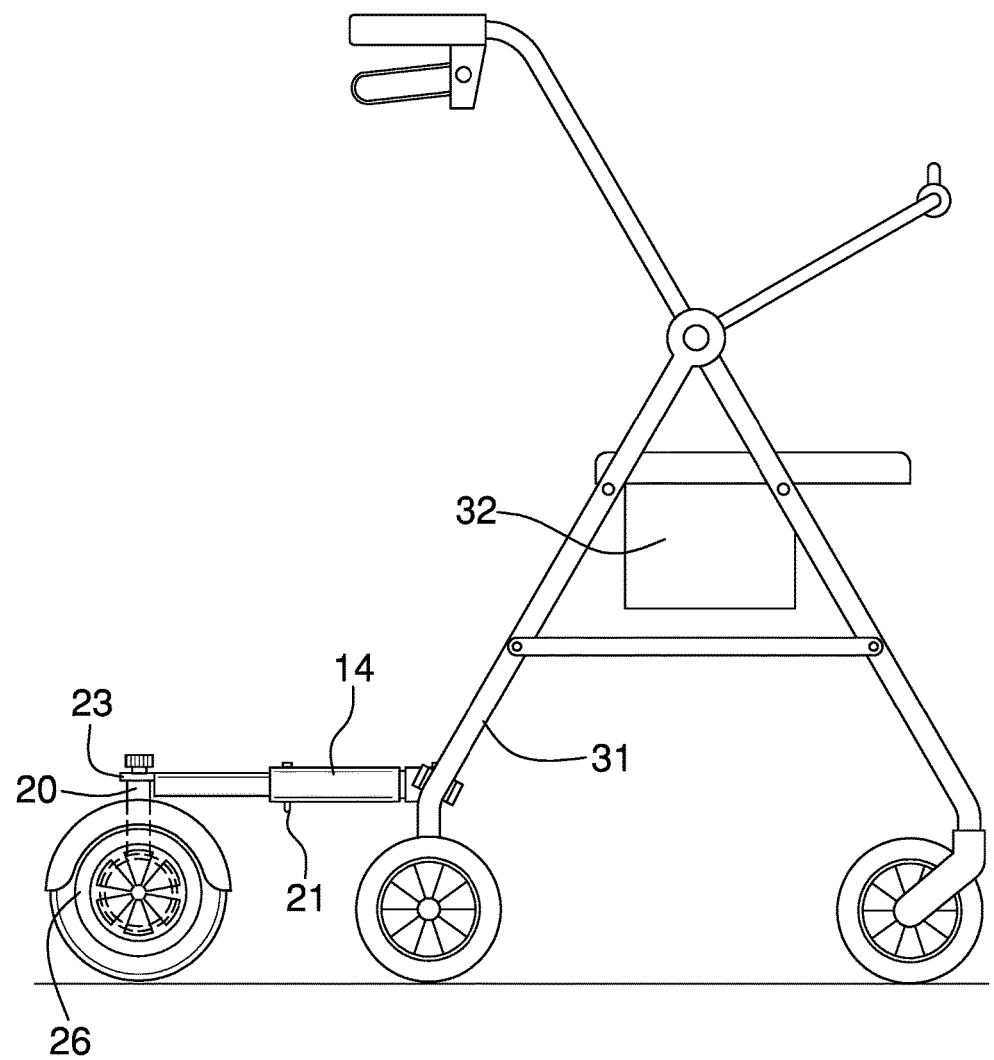
FIG. 3 is a side elevation view of the hoverboard walker attachment apparatus attached to a hoverboard and a walker.
Figure 4:
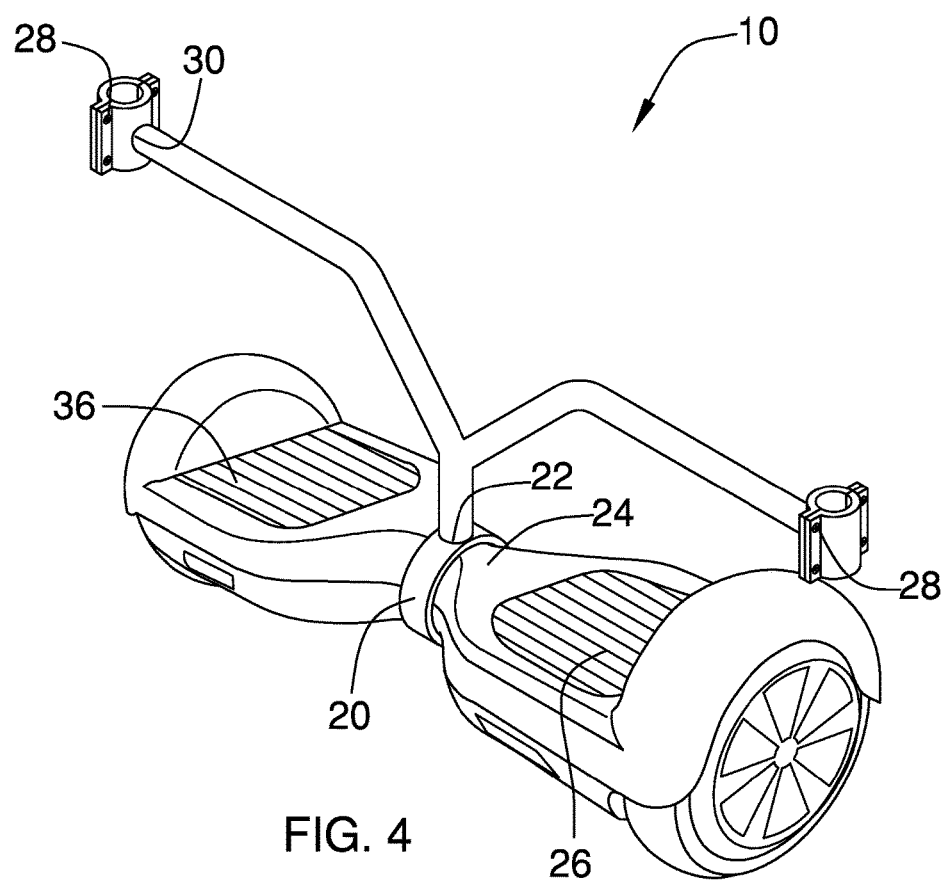
FIG. 4 is an isometric view of an alternative embodiment of the hoverboard walker attachment apparatus attached to a hoverboard.
Figure 5:
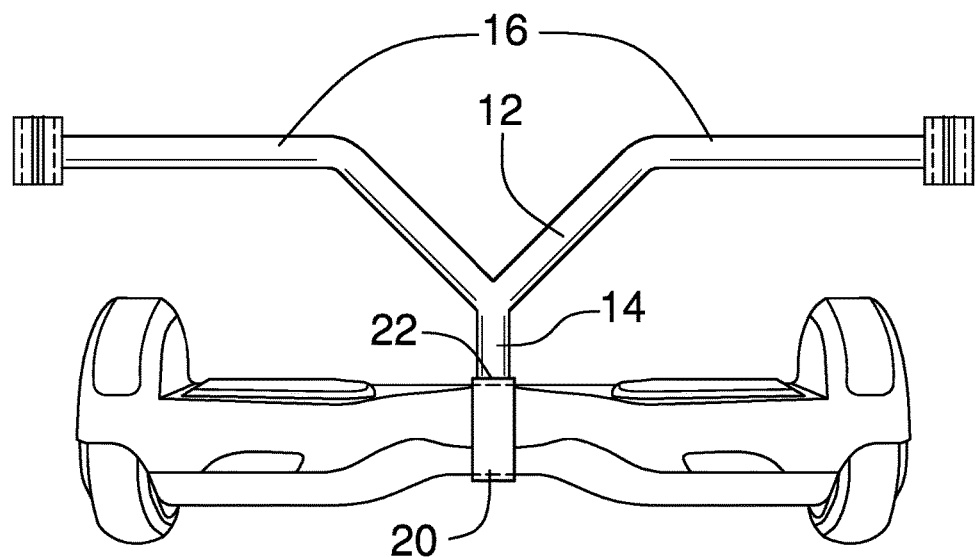
FIG. 5 is a rear elevation view of the alternative embodiment of the hoverboard walker attachment apparatus attached to a hoverboard.
Figure 6:
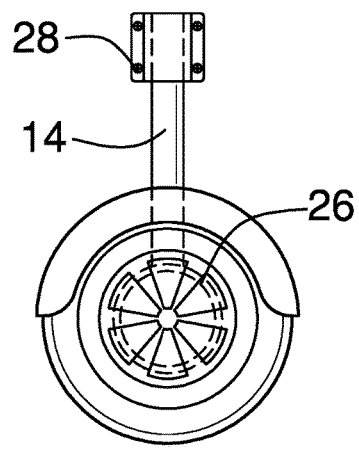
FIG. 6 is a side elevation view of the alternative embodiment of the hoverboard walker attachment apparatus attached to a hoverboard.
Figure 7:
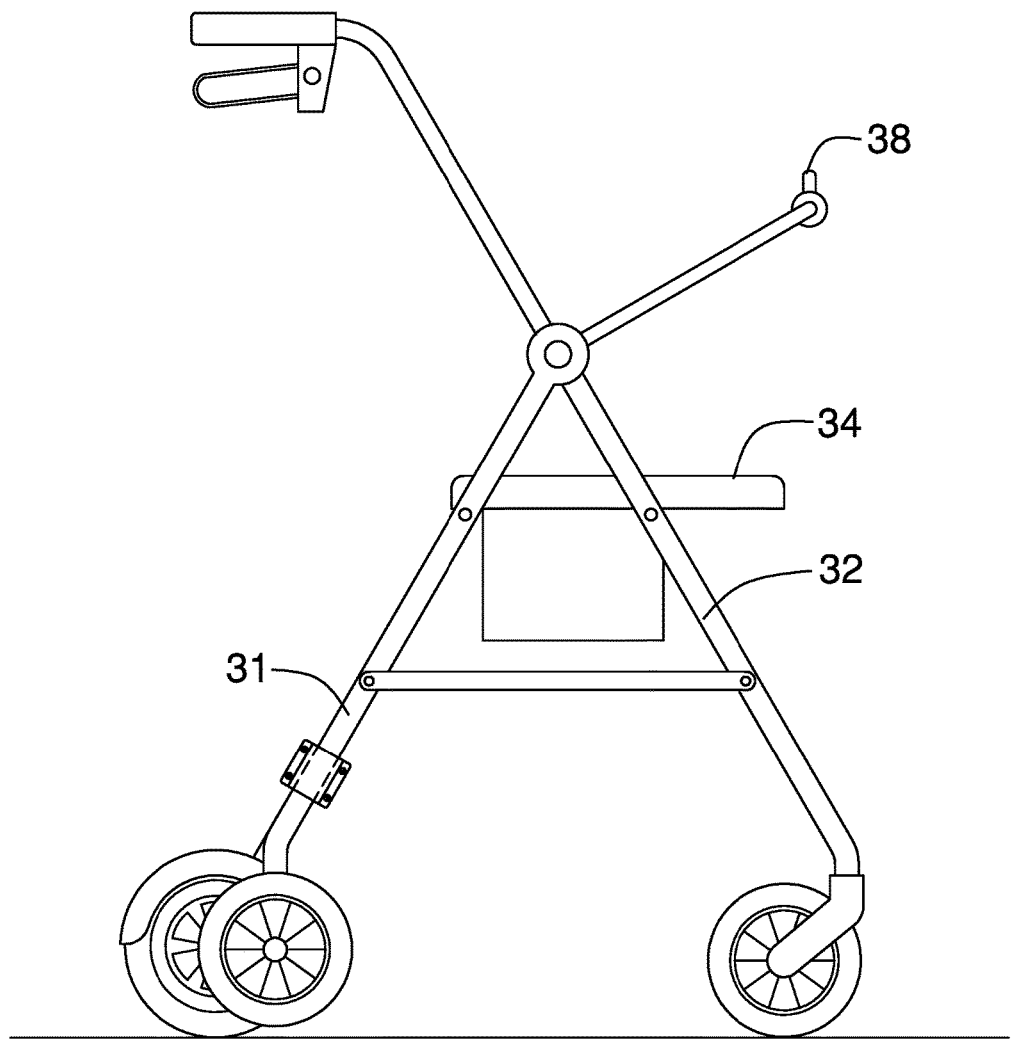
FIG. 7 is an in-use side elevation view of the alternative embodiment of the hoverboard walker attachment apparatus attached to a hoverboard and a walker.
Figure 8:
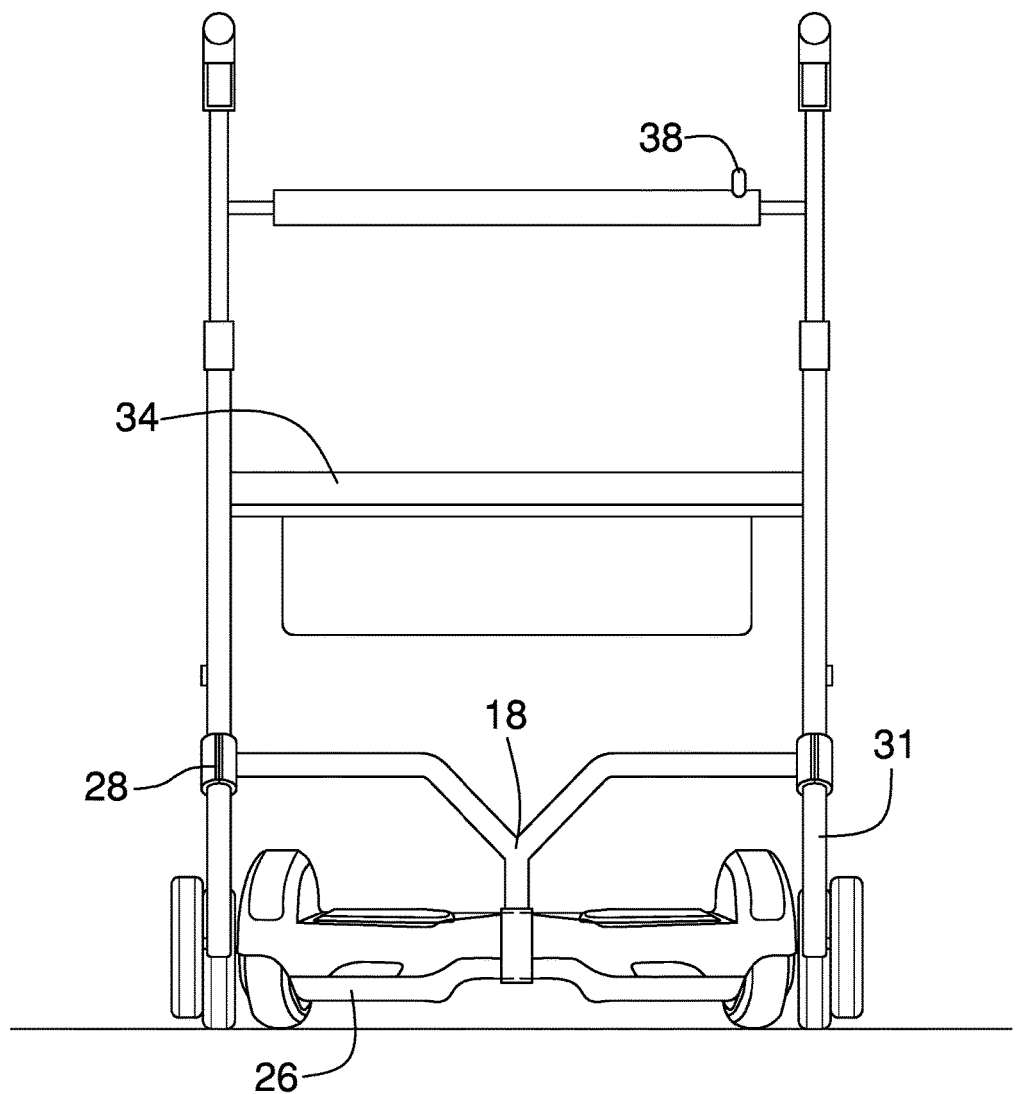
FIG. 8 is a rear elevation view of the alternative embodiment of the hoverboard walker attachment apparatus attached to a hoverboard and a walker.

With reference now to the drawings, and in particular FIGS. 1 through 8 thereof, an example of the instant hoverboard walker attachment apparatus employing the principles and concepts of the present hoverboard walker attachment apparatus and generally designated by the reference number 10 will be described.

Referring to FIGS. 1 through 8 the present hoverboard walker attachment apparatus 10 is illustrated. The hoverboard walker attachment apparatus 10 includes a principal support 12 having a stem 14 and a pair of arms 16 disposed on a joint 18 thereof. The stem 14 and each of the pair of arms 16 optionally have an adjustment mechanism 15, wherein the adjustment mechanism is configured to change a length 17 of each of the stem and the pair of arms. The adjustment mechanism can be, but is not limited to, a plurality of apertures 19 and a pin 21. A hoverboard clamp attachment 23 is disposed on a base 22 of the principal support 12. The hoverboard clamp attachment is configured to be rotatably and removably disposed on a hoverboard clamp 20 that is removably disposed on a middle 24 of a hoverboard 26 such that it is completely fixed and secure. A pair of walker clamps 28 is disposed on a distal end 30 of each of the pair of arms 16. In an ideal embodiment of the invention, each of the pair of walker clamps 28 is a C-shape 29 that is selectively engageable with a leg 31 of a walker 32. In an alternative embodiment of the invention, each of the pair of walker clamps is removably disposed on the leg 31 of the walker such that it is completely fixed and secure. A user sits on a seat 34 of the walker 32 and places his or her feet onto a pair of platforms 36 of the hoverboard 26. A kill switch 38 in operational communication with the hoverboard 26 may be disposed on the walker 32, wherein the kill switch is configured to cut power to the hoverboard.

What is claimed is:

1. A hoverboard walker attachment apparatus comprising:
a principal support having a stem and a pair of arms disposed on a joint thereof;
a hoverboard clamp attachment disposed on a base of the principal support, wherein the hoverboard clamp attachment is configured to be pivotably and removably disposed on a hoverboard clamp disposed on a middle of a hoverboard; and
a pair of walker clamps, wherein each of the pair of walker clamps is disposed on a distal end of each of the pair of arms such that each of said walker clamps is positioned outwardly offset from said hoverboard when the principal support is unpivoted and the pair of arms are parallel to the hoverboard, wherein each of the pair of walker clamps is removably disposed on respective lateral upright sections of a frame of a walker wherein said hoverboard is positioned centrally between said lateral upright sections of said frame of said walker.

2. A hoverboard walker attachment apparatus comprising:
a principal support having a stem and a pair of arms disposed on a joint thereof, wherein the stem and each of the pair of arms have an adjustment mechanism, wherein the adjustment mechanism is configured to change a length of each of the stem and the pair of arms;
a hoverboard clamp attachment disposed on a base of the principal support, wherein the hoverboard clamp attachment is configured to be pivotably and removably disposed on a hoverboard clamp disposed on a middle of a hoverboard; and
a pair of walker clamps, wherein each of the pair of walker clamps is rotatably disposed on a distal end of each of the pair of arms such that said walker clamps are extendable to a positions laterally offset outwardly from the hoverboard when the principal support is unpivoted and said pair of arms are positioned parallel with the hoverboard, wherein each of the pair of walker clamps is selectively engageable with respective lateral sections of a frame of a walker wherein said hoverboard is positioned centrally between said lateral upright sections of said frame of said walker.

* * * * *